US008364675B1

(12) United States Patent
Vorobyov

(10) Patent No.: US 8,364,675 B1
(45) Date of Patent: Jan. 29, 2013

(54) RECURSIVE ALGORITHM FOR IN-PLACE SEARCH FOR AN N:TH ELEMENT IN AN UNSORTED ARRAY

(75) Inventor: Alexey Vorobyov, Irvine, CA (US)

(73) Assignee: Google Inc, Mountain View, CA (US)

( * ) Notice: Subject to any disclaimer, the term of this patent is extended or adjusted under 35 U.S.C. 154(b) by 131 days.

(21) Appl. No.: 12/827,371

(22) Filed: Jun. 30, 2010

(51) Int. Cl.
*G06F 17/30* (2006.01)

(52) U.S. Cl. .......................... 707/736; 707/801

(58) Field of Classification Search ................. None
See application file for complete search history.

(56) References Cited

U.S. PATENT DOCUMENTS

| | | | | |
|---|---|---|---|---|
| 7,467,138 | B2 * | 12/2008 | Carroll | 1/1 |
| 7,509,309 | B2 * | 3/2009 | Carroll | 1/1 |
| 8,250,055 | B2 * | 8/2012 | Ditto et al. | 707/706 |
| 2005/0108230 | A1 * | 5/2005 | Carroll | 707/7 |
| 2006/0195460 | A1 * | 8/2006 | Nori et al. | 707/100 |
| 2009/0119297 | A1 * | 5/2009 | Carroll | 707/7 |
| 2009/0259617 | A1 * | 10/2009 | Cownie et al. | 707/2 |
| 2010/0121848 | A1 * | 5/2010 | Yaroslavskiy et al. | 707/736 |

OTHER PUBLICATIONS

"Selection algorithm", retrieved from http://en.wikipedia.org/wiki/Selection_algorithm on Jun. 30, 2010.

* cited by examiner

*Primary Examiner* — Debbie Le
(74) *Attorney, Agent, or Firm* — Mollborn Patents, Inc.; Fredrik Mollborn

(57) ABSTRACT

Methods and apparatus, including computer program products, for searching for an n:th array element in an unsorted array in a computer memory. The n:th array element is selected as an initial pivot element. A smaller subset of array elements, including the pivot element, is iteratively selected until the smaller subset includes a predetermined number of array elements. In each iteration, an array element corresponding to the n:th array element in the smaller subset is searched for. Array elements are iteratively added onto the subset of array elements, until the number of array elements is equal to the number of array elements in the initial unsorted array. In each iteration, the larger set of array elements is partitioned based on a pivot element located at a position corresponding to the n:th position in a smaller subset of array elements. The n:th array element in the final array is finally selected.

13 Claims, 3 Drawing Sheets

RECURSIVE ALGORITHM FOR IN-PLACE SEARCH FOR AN N:TH ELEMENT IN AN UNSORTED ARRAY

BACKGROUND

The subject matter herein relates to computer algorithms for in-place searching in arrays. Arrays are among the oldest and most important data structures, and are used by a majority of computer programs. Arrays effectively exploit the addressing machinery of computers. In most modern computers (and in many external storage devices), the memory is a one-dimensional array of words, and the array's indices form the addresses of the words. Processors, especially vector processors, are often optimized for array operations, so having data in the form of arrays typically speeds up the processing significantly.

Arrays are useful mostly because the element indices can be easily computed at run time. This feature allows, for example, a single iterative statement to process arbitrarily many elements of an array. Arrays can be sorted or unsorted. The most common way to store data in arrays is to store the data in an unsorted array. As was discussed above, one of the main advantages with arrays is that that they allow fast access to elements by index and this access is independent of the contents of the array. For example, imagine that a list of people in the office is created by putting the name of each person on one line and assigning consecutive numbers to these lines. It will be very quick and easy to find the name that is associated with number 27. However, it will be difficult to find a person with the last name Smith. To allow the second operation to be faster, it would be desirable to sort people in the list alphabetically.

In computer science, a selection algorithm is an algorithm for finding the n:th smallest number in a list (such a number is called the n:th order statistic). This includes the cases of finding the minimum, maximum, and median elements. Selection is a sub-problem of more complex problems like the nearest neighbor problem and shortest path problems. Often selection can be reduced to sorting by sorting the list and then extracting the desired element. Another general application is to show the "Top-n elements" of an array without sorting the entire array. This can be done by finding the n:th number, selecting numbers that precede the n:th number and sorting only these n numbers. This can speed up things significantly if the array contains thousands of elements and only the top-10, say, should be displayed.

As is well known to computer programmers, the O( ) notation is frequently used in the analysis of algorithms to describe an algorithm's usage of computational resources. The worst case or average case running time or memory usage of an algorithm is often expressed as a function of the length of its input, using the O( ) notation. For example, O(N) indicates that the number of operations increases with N at a rate that is less than or equal to some linear function of N, where N is the size of the array, while $O(N^2)$ indicates that the number of operations increases with N at a rate that is less than or equal to some square function of N, etc. This allows algorithm designers to predict the behavior of their algorithms and to determine which one among multiple algorithms to use in a way that is independent of specific computer architectures or clock rates.

Current algorithms for searching an unsorted array, such as the partition-based general selection algorithm "nth_element" in STL (Standard Template Library), which is a standard library for C++ developers, has an O(N) average performance and an $O(N^2)$ worst performance. It is also well known that such algorithms are subject to attack when an attacker supplies specially fabricated arrays to increase load on server in Denial-of-Service (DOS) attacks. There are also O(N) worst case algorithms, such as the one discussed in "The Art of Computer Programming" by Donald Knuth (Addison-Wesley Professional; 2nd edition, Oct. 15, 1998), in which a median is found by looking for medians of 5-plets and then looking for medians of medians. Unfortunately, this algorithm's implementation either requires O(N) external storage, or significant data copying. In addition, the complexity of this algorithm involves a large scale factor. Thus, it is preferable to use this algorithm only in the case of very large N.

One limitation of the above algorithms is that they are designed to look for specific quantiles only, such as the median. They could be applied to generic nth-element search by using subdivision of the segment by 2 which, however, would increase the scale factor of the algorithm complexity by another factor of 2.

SUMMARY

In general, in one aspect, the various implementations provide methods and apparatus, including computer program products, for searching for an n:th array element in an unsorted array including several array elements in a computer memory. The n:th array element is selected as an initial pivot element among the array elements in the unsorted array. A smaller subset of array elements in the unsorted array is iteratively selected, the smaller subset including the pivot element, until the smaller subset of array elements includes a predetermined number of array elements. In each iteration, an array element is searched for that corresponds to the n:th array element in the selected smaller subset of array elements. Array elements from the unsorted array are iteratively added onto the smaller subset of array elements, until the number of array elements is equal to the number of array elements in the initial unsorted array. In each iteration, the larger set of array elements is partitioned based on a pivot element located at a position corresponding to the n:th position in a smaller subset of array elements. The n:th array element in the final array is finally selected.

Implementations can include one or more of the following features. Iteratively selecting a smaller subset of array elements can include: For each iteration, determining a first distance between the pivot element and a first array element in a current set of array elements; determining a second distance between the pivot element and a last array element in a current set of array elements; determining a ratio between the first and second distances; and selecting a smaller subset of array elements in which the ratio is substantially the same between the first and second distances. The array elements can be sorted in ascending order when the array includes the predetermined number of array elements. Partitioning the larger set of array elements can include rearranging array elements around the pivot element such that all array elements on one side of the pivot element have lower values than the value of the pivot element, and all array elements on another side of the pivot element have higher values than the value of the pivot element. Selecting the n:th array element can have a worst performance of O(N), where N is the number of array elements in the unsorted array. The predetermined number of array elements can be three or fewer array elements.

Various implementations can include one or more of the following advantages. It is possible to do a search for an n:th element in an unsorted array of N elements with a guaranteed worst time of O(N). The algorithm for searching is an in-place search algorithm, that is, no additional storage is required for storing array elements. The algorithm automatically adjusts to search for the right percentile, without any need to search for intermediates, such as a median. As a result, the algorithm has very low memory requirements, is free from DOS attacks and has a very small scale factor.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Overview

Figure 1A:
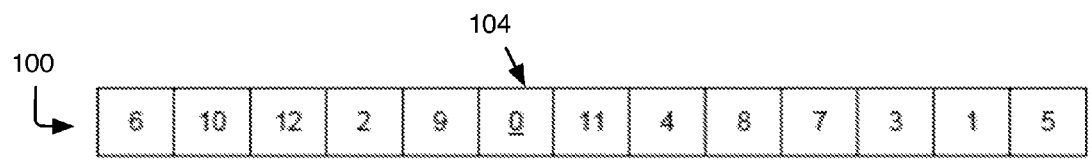
FIGS. 1A-1V show the various modifications of an array that occur when searching for an n:th element in an unsorted array of N elements, in accordance with one implementation.

In accordance with various implementations, methods and apparatus, including computer program products, are provided which enable searching for an element in an unsorted array. In particular, an algorithm is provided that searches for an n:th element in unsorted array of N elements by searching for a corresponding element in recursively smaller subset of the array. Furthermore, the search for the n:th element in the unsorted array is conducted in place, that is, without additional storage to store array elements, with a worst performance of O(N).

The algorithm has additional memory requirements that is O(log N) for storing a search state. It is a recursive algorithm and needs this memory only to store a local state, such as the left and right iterators of a current segment. The algorithm automatically adjusts to search for the right percentile, without searching for intermediates, like the median. As a result, the algorithm has low memory requirements, is free from DOS attacks, and has very small scale factor. Various implementations of the algorithm will now be described by way of example. As the skilled person realizes, many variations can be made within the scope of the claims.

Pseudo-Code for Recursive Algorithm

Below is a pseudo-code description of one implementation of the algorithm. The algorithm below uses a helper function, "partition," whose task is to partition an array, "array[ ]". The array is partitioned in such a way that in the final partitioned array, the elements to the left of the pivot element are all smaller than the pivot, and the elements to the right of the pivot element are all larger than the pivot. The pivot is the value of the n:th element in the original array. This general concept is familiar from many conventional algorithms, such as, for example the "BFPRT" algorithm published by Blum, Floyd, Pratt, Rivest and Tarjan in their paper "Time Bounds for Selection" (Journal of Computer and System Sciences, vol. 7, No. 4, August 1973), which in turn is based on the "Quicksort" algorithm by C. A. R. Hoare. The performance of both of these algorithms is sensitive to the pivot that is chosen. That is, if bad pivots are consistently chosen, the worst performance of these algorithms is $O(N^2)$ time. Thus, it is important to have a carefully chosen partition function that selects pivot elements in an efficient way, as will now be described.

The "partition" function returns the new position of the pivot element. The partition function uses the following input parameters: array [ ] (i.e., the original array), first (i.e., the index of the first element in a portion of the array that is processed in a current iteration), first_sorted (i.e., the index of the first element in a portion of the array that was processed (i.e., already sorted) in the previous iteration), n-th (i.e., the index of the element that is selected as a pivot point), last_sorted (i.e., the index of the last element in a portion of the array that was processed (i.e., already sorted) in the previous iteration) and last (i.e., the index of the last element in a portion of the array that is processed in a current iteration).

```
function nth_element(Object array[ ], int first, int nth, int last)
    while (last-first>3) {
        nth_element (array, (first+nth)/2, nth, (last+nth)/2);
        pos=partition (array, first, (first+nth)/2, nth, (last+nth)/2,
           last);
        if (pos<nth) {
            first=pos;
        } else if (pos>nth) {
            last=pos;
        } else {
            return;
        }
        sort (first, last);
    }
}
```

Example Use of Algorithm

Figure 1B:
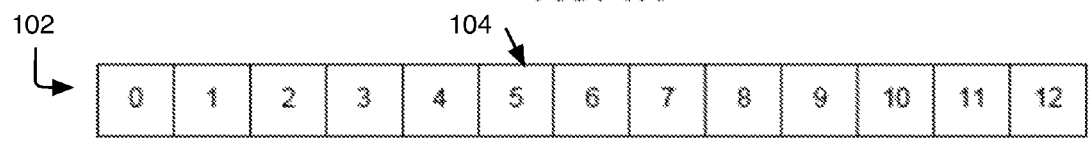
Figure 1C:
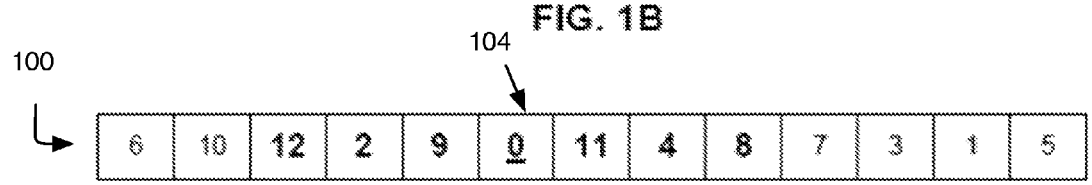
Figure 1D:
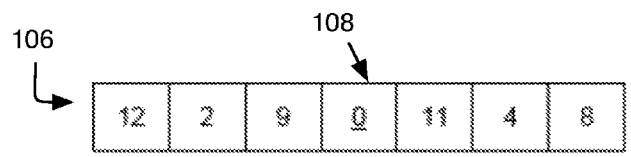
Figure 1E:
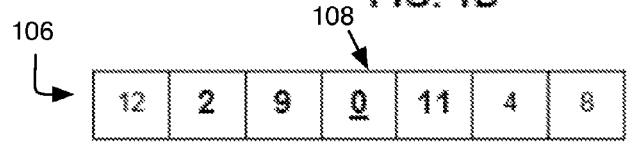
Figure 1F:
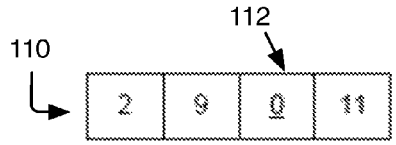
Figure 1G:
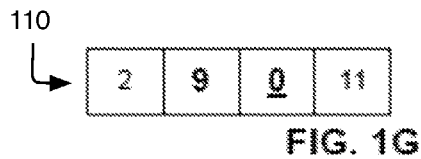

To further improve the understanding of the implementation shown above, an example illustrating a use of the algorithm will now be described with reference to FIGS. 1A-1V. For the purposes of this example, consider an original unsorted array (100) of N=13 elements, as illustrated in FIG. 1A. The task is to find the $6^{th}$ element (i.e., n=6), which in this case must be 5, because in a sorted array (102) that is the number of the element in the $6^{th}$ position (104), as illustrated in FIG. 1B.

To find the $6^{th}$ element in the 13 element array the search for tentative solution is limited to a 7-element array, surrounding the $6^{th}$ position. In this specific case, that would be the 7-element array centered around the number "0", which is original pivot value located in the $6^{th}$ position (104) of the original array (100) shown in FIG. 1A. This 7-element array (106) is shown in FIG. 1C, with bold and enlarged numbers. A detailed description of how to select the elements that form the smaller array (106) will be provided in a separate section below. Furthermore, for purposes of better understanding the various steps described below, the pivot element will be underlined in each of FIGS. 1A-1V.

Now, the original search for the $6^{th}$ element (104) in 13-element array will be reduced to a search for the $4^{th}$ element (108) in this 7-element array (106). The 7-element array (106) is illustrated in FIG. 1D. Similar to what was described above, a smaller subset is selected, in this case a 4-element array (110), shown by the bolded numbers in FIG. 1E. The next task is to find the $3^{rd}$ element (112) in the 4-element array (110) shown in FIG. 1F by using the same techniques above and selecting the bolded elements shown n FIG. 1G.

Figure 1H:
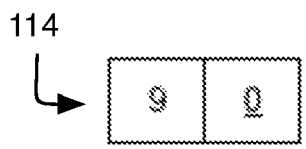
Figure 1I:
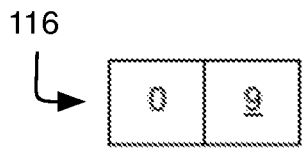

Continuing in the same fashion, the next task is to find the second element in the 2-element array (114) shown in FIG. 1H. Since the array (114) in FIG. 1H is smaller than 3 elements, the 2-element array (114) is sorted by comparing and switching the elements of this array (114). The resulting array (116) is shown in FIG. 1I.

Figure 1J:
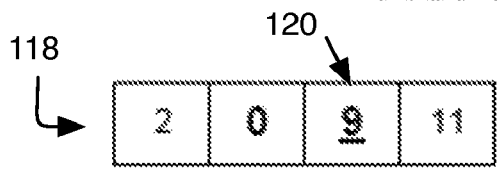

Next, reverse propagation is started. That is, elements are added onto the 2-element array. In this case, elements 2 and 11 would be added on, as shown in FIG. 1J, to form a 4-element array (118). The already sorted numbers, i.e, the [0, 9] array shown in FIG. 1I are marked as bold in the array (118) of FIG. 1J. Now, the found pivot number 9 (120) is applied to partition the array in such a way, that to the left of number 9 are numbers that are smaller than 9, while to the right of 9 we have numbers that are larger than 9. Since all the elements are already in the right order, no changes are made to the array.

Figure 1K:
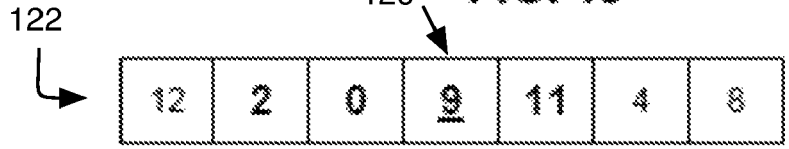
Figure 1L:
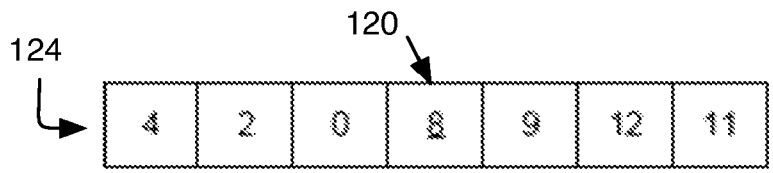

Next, elements 12, 4 and 8 are added to the array, in the same positions as shown in FIG. 1E. The resulting 7-element array (122) is shown in FIG. 1K. Now, partitioning is performed on this array (122) with the value 9 (120) as the pivot value, which results in the array (124) shown in FIG. 1L. There are many ways to implement the partitioning that can be realized by those of ordinary skill in the art. Regardless of the particular implementation, the result of the partitioning is an array in which all elements to the left of the pivot element (120) have values that are not larger than the pivot element value, whereas elements to the right of the pivot element have values that are not smaller than the pivot element value. In addition, the position of the pivot element in the array is determined. Since the $4^{th}$ element (120) in FIG. 1L now contains the number 8 and the previous pivot value 9 is now to the right of number 8, it is necessary to find a new pivot value. Since the number 9 is to the right of the pivot position (120), it can be concluded that there are more numbers smaller than 9 and fewer numbers larger than 9 in the array (124) of FIG. 1L. Thus, the new pivot element must be an element that is smaller than 9. Since it is known that all of the elements to the left of number 9 are smaller, it is sufficient to limit the search to these elements, as illustrated by the array in FIG. 1M.

Figure 1M:
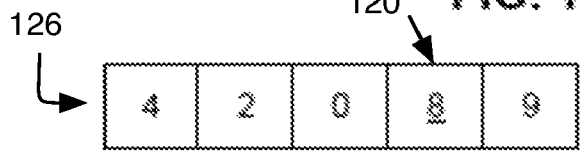
Figure 1N:
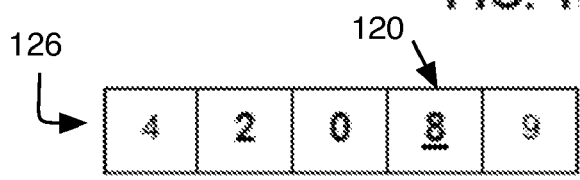
Figure 1O:
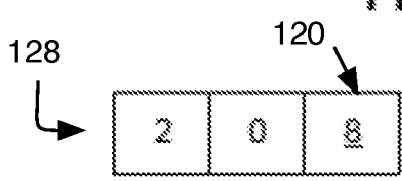
Figure 1P:
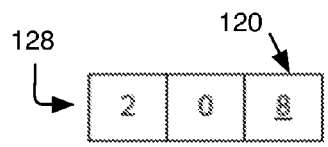
Figure 1Q:
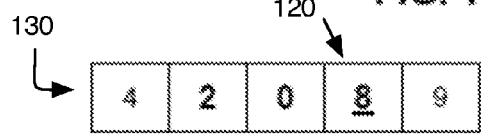
Figure 1R:
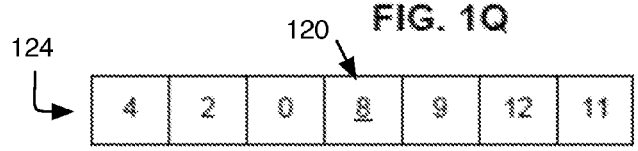

Thus, a search for the $4^{th}$ number (120) in the array (126) shown in FIG. 1M is then performed in the same way that was described above. The steps of this search are illustrated in FIGS. 1N-1R. As can be seen in FIG. 1R, the $4^{th}$ number (120) turned out to be "8", i.e., the same array (124) is obtained as in FIG. 1L.

Figure 1S:
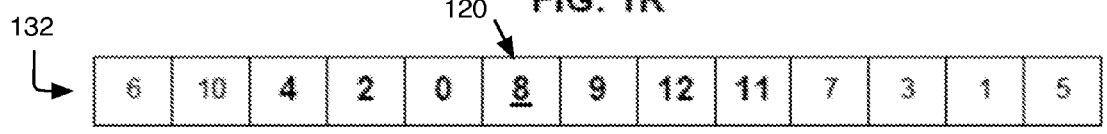

Now, the numbers from the original array (100) can be added, resulting in the array (132) shown in FIG. 1S. The new pivot value "8" (120) from the smaller array (124) can now be used as a pivot value for original array (100).

Next, the partition of the array (132) in FIG. 1S is calculated with respect to the pivot number "8" (120). Since it is already known that the elements to the left and right, respectively, in the array of FIG. 1R are smaller/larger than pivot value, only elements outside the array (124) shown in FIG. 1R (i.e., the elements that are not bolded in FIG. 1S) need to be partitioned. The resulting array (134) is shown in FIG. 1T.

Figure 1T:
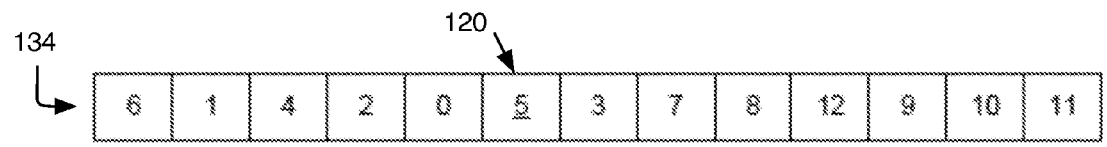
Figure 1U:
Figure 1V:
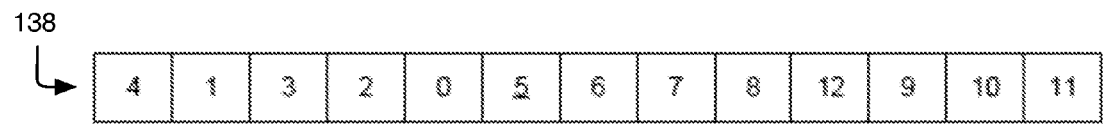

Since the number "8" is no longer in the $6^{th}$ position (120) in the array (134) shown in FIG. 1T, it is necessary to repeat the algorithm, but only for values smaller than "8", i.e., the elements shown in the array (136) of FIG. 1U. This is used doing the above-mentioned technique, which ultimately results in the final array (138) shown in FIG. 1V, which has number "5" in the $6^{th}$ position, just as expected from the prediction (102) in FIG. 1B.

Selection of Subset of Array Elements

In order to illustrate how the selection of a subset of array elements is done in the above example use of the algorithm in accordance with one implementation, a more detailed description of one implementation will now be provided by way of example. It should be realized that this is merely an example and that there are many variations that can be realized by those of ordinary skill in the art. Some of these variations will be described below, but these should by no means be interpreted as a complete list.

Initially, it should be noted that while the selection of a subset of array elements is an important part of the above algorithm, the selection process is not related to the partitioning process. The selection process relates to selecting an appropriate subset of array elements that will form the new array to be processed in the next step of the search algorithm. The partitioning process, on the other hand, relates to arranging smaller and larger elements, respectively, on either side of a selected partitioning element.

In selecting a subset of array elements, it is desirable for the position of the pivot element to be at approximately the same ratio of distances from either end of the subset, as it is from the ends of the full array. For example, assume that the search is for the $7^{th}$ element in a 35 element array. The distance to the left end of the 35 element array is 7, and the distance to the right end is 28, thus resulting in a ratio of 1:4. This is the ratio that should be preserved as close as possible.

Thus, in the above pseudo-code, both these distances are divided by 2. This results in the selection of element 3 (i.e. (7+0)/2) as the left end element of the new array, which has a distance of 4 elements from element 7. Using the same technique, the right element of the new array is element 21 (i.e., (7+35)/2), which has a distance of 14 elements from element 7. Thus, the ratio is 4:14=2:7, which is approximately equal to 1:4, as desired.

What is important in selecting this subset is that the algorithm's performance can be fine-tuned by selecting the speed with which the ends of an array approach the pivot point. For example, instead of selecting the pivot point as being the midpoint of the subset, as described above, end points can be selected that are ⅓ of the distance to the pivot by using the formulas (7*2+0*1)/3=4 for the left endpoint and (7*2+35*1)/3=16 for the right endpoint, respectively. Alternatively, end points can be selected that are ¾ of the distance to the pivot by using the formulas (7*1+3*0)/4=1 for the left endpoint and (7*1+35*3)/4=28 for the right endpoint, respectively.

In the first case where ⅓ is selected, fewer iterations are need to reach very small arrays, but the pivot value might not be very good, which would cause more expansions and reductions of the array. In the second case where a larger subset is selected (¾ of the array on either side), the size of the array will be reduced more slowly, but the pivot value will likely be a better one, which would reduce the number of expansions and reductions of the array. Thus, depending on the particular situation in which the search algorithm is used, there may be different "sweet spots" that allow the search to be as efficient as possible.

Further Variations and Implementations

Preliminary experiments show that in addition to the above-described algorithm being free from the O(N^2) worst case flaw in the current implementation of the STL algorithm, the algorithm described herein is also results in approximately 30-50% fewer comparisons. This is a significant improvement, as comparisons of strings or other complicated data structures are time-consuming. Further, the above-described algorithm requires 30-60% fewer element swapping operations. This is important when large data structures are stored in arrays and elements need to be swapped, as opposed to merely having to swap references, which can be done in many other situations.

The inefficiency of element swapping compared to reference swapping can be further clarified using the above analogy with the name list. Imagine, for example, that two elements (i.e., the names of people) in the list need to be swapped. One way to do this is to erase one name, write a second name in the erased spot, then erase the second name from its original spot and fill in that spot with the name that was erased first. This is analogous to the element swapping. Another, more efficient, way of achieving the same result is to keep the original list, in which each name has an index (i.e., a reference). Instead of having to erase and re-write the long names, the references (which are numbers and much shorter) can be rewritten at the different positions for the names in the original list. This is analogous to the reference swapping. In the context of computers, a reference is typically an address of data in memory, and it is generally also much shorter than the data element itself. Thus, it is usually significantly faster to swap two references (addresses) than two data structures stored in an array, which is rather common.

Various implementations can be implemented in digital electronic circuitry, or in computer hardware, firmware, software, or in combinations of them. Apparatus can be implemented in a computer program product tangibly embodied in a machine-readable storage device for execution by a programmable processor; and method steps can be performed by a programmable processor executing a program of instructions to perform functions by operating on input data and generating output. Various implementations can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the various implementations can be implemented on a computer system having a display device such as a monitor or LCD screen for displaying information to the user. The user can provide input to the computer system through various input devices such as a keyboard and a pointing device, such as a mouse, a trackball, a microphone, a touch-sensitive display, a transducer card reader, a magnetic or paper tape reader, a tablet, a stylus, a voice or handwriting recognizer, or any other well-known input device such as, of course, other computers. The computer system can be programmed to provide a graphical user interface through which computer programs interact with users.

Finally, the processor optionally can be coupled to a computer or telecommunications network, for example, an Internet network, or an intranet network, using a network connection, through which the processor can receive information from the network, or might output information to the network in the course of performing the above-described method steps. Such information, which is often represented as a sequence of instructions to be executed using the processor, may be received from and outputted to the network, for example, in the form of a computer data signal embodied in a carrier wave. The above-described devices and materials will be familiar to those of skill in the computer hardware and software arts.

It should be noted that the various implementations employ various computer-implemented operations involving data stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part are useful machine operations. The manipulations performed are often referred to in terms, such as, producing, identifying, running, determining, comparing, executing, downloading, or detecting.

A number of implementations have been described. Nevertheless, it will be understood that various modifications may be made. Accordingly, other implementations are within the scope of the following claims

The invention claimed is:

1. A computer-implemented method for in-place searching for an n:th array element in an unsorted array including a plurality of array elements in a computer memory, the method comprising:
   selecting the n:th array element as a single initial pivot element among the array elements in the unsorted array;
   iteratively selecting a smaller subset of array elements in the unsorted array, the smaller subset including the pivot element, until the smaller subset of array elements includes a predetermined number of array elements;
   in each iteration, searching for an array element corresponding to the n:th array element in the selected smaller subset of array elements;
   iteratively adding array elements from the unsorted array onto the smaller subset of array elements, until the number of array elements is equal to the number of array elements in the initial unsorted array;
   in each iteration, partitioning the larger set of array elements based on a pivot element located at a position corresponding to the n:th position in a smaller subset of array elements; and
   selecting the n:th array element in the final array.

2. The method of claim 1, wherein iteratively selecting a smaller subset of array elements includes:
   for each iteration:
      determining a first distance between the pivot element and a first array element in a current set of array elements;
      determining a second distance between the pivot element and a last array element in a current set of array elements;
      determining a ratio between the first and second distances; and
      selecting a smaller subset of array elements in which the ratio is substantially the same between the first and second distances.

3. The method of claim 1, further comprising:
   sorting the array elements in ascending order when the array includes the predetermined number of array elements.

4. The method of claim 1, wherein partitioning the larger set of array elements includes:
   rearranging array elements around the pivot element such that all array elements on one side of the pivot element have values that are not larger than the value of the pivot element, and all array elements on another side of the pivot element have values that are not higher than the value of the pivot element.

5. The method of claim 1, wherein selecting the n:th array element has a worst performance of O(N), where N is the number of array elements in the unsorted array.

6. The method of claim 1, wherein the predetermined number of array elements is three or fewer array elements.

7. A computer program product, stored on a machine-readable medium, for in-place searching for an n:th array element in an unsorted array including a plurality of array elements in a computer memory, comprising instructions operable to cause a computer to:
   select the n:th array element as a single initial pivot element among the array elements in the unsorted array;
   iteratively select a smaller subset of array elements in the unsorted array, the smaller subset including the pivot element, until the smaller subset of array elements includes a predetermined number of array elements;
   in each iteration, search for an array element corresponding to the n:th array element in the selected smaller subset of array elements;
   iteratively add array elements from the unsorted array onto the smaller subset of array elements, until the number of array elements is equal to the number of array elements in the initial unsorted array;
   in each iteration, partition the larger set of array elements based on a pivot element located at a position corresponding to the n:th position in a smaller subset of array elements; and
   select the n:th array element in the final array.

8. The computer program product of claim 7, wherein the instructions to iteratively select a smaller subset of array elements include instructions to:
   for each iteration:
      determine a first distance between the pivot element and a first array element in a current set of array elements;
      determine a second distance between the pivot element and a last array element in a current set of array elements;
      determine a ratio between the first and second distances; and
      select a smaller subset of array elements in which the ratio is substantially the same between the first and second distances.

9. The computer program product of claim 7, further comprising instructions to:
   sort the array elements in ascending order when the array includes the predetermined number of array elements.

10. The computer program product of claim 7, wherein the instructions to partition the larger set of array elements include instructions to:
   rearrange array elements around the pivot element such that all array elements on one side of the pivot element have lower values than the value of the pivot element, and all array elements on another side of the pivot element have higher values than the value of the pivot element.

11. The computer program product of claim 7, wherein the instructions to select the n:th array element has a worst performance of O(N), where N is the number of array elements in the unsorted array.

12. The computer program product of claim 7, wherein the predetermined number of array elements is three or fewer array elements.

13. A computer system for in-place searching for an n:th array element in an unsorted array including a plurality of array elements in a computer memory, comprising:
   a memory configured and arranged to store an unsorted array including a plurality of array elements; and
   a controller, coupled to the memory, the controller arranging and storing the plurality of array elements according to an algorithm which:
      selects the n:th array element as a single initial pivot element among the array elements in the unsorted array;
      iteratively selects a smaller subset of array elements in the unsorted array, the smaller subset including the pivot element, until the smaller subset of array elements includes a predetermined number of array elements;
      in each iteration, searches for an array element corresponding to the n:th array element in the selected smaller subset of array elements;
      iteratively adds array elements from the unsorted array onto the smaller subset of array elements, until the number of array elements is equal to the number of array elements in the initial unsorted array;
      in each iteration, partitions the larger set of array elements based on a pivot element located at a position corresponding to the n:th position in a smaller subset of array elements; and
      selects the n:th array element in the final array.

* * * * *